(12) United States Patent
MacPherson

(10) Patent No.: US 9,586,443 B2
(45) Date of Patent: *Mar. 7, 2017

(54) SEGMENTED TIRE APPARATUS

(71) Applicant: SCENNCO INC., Gothenburg, NE (US)

(72) Inventor: Eric R. MacPherson, Gothenburg, NE (US)

(73) Assignee: Scennco, Inc., Gothenburg, NE (US)

(*) Notice: Subject to any disclaimer, the term of this patent is extended or adjusted under 35 U.S.C. 154(b) by 30 days.

This patent is subject to a terminal disclaimer.

(21) Appl. No.: 14/155,423

(22) Filed: Jan. 15, 2014

(65) Prior Publication Data

US 2014/0125113 A1 May 8, 2014

Related U.S. Application Data

(63) Continuation of application No. 13/632,373, filed on Oct. 1, 2012, now Pat. No. 8,678,054, which is a continuation of application No. 13/038,082, filed on Mar. 1, 2011, now abandoned.

(51) Int. Cl.
*B60C 7/08* (2006.01)
*B60C 11/03* (2006.01)
*B60C 7/12* (2006.01)

(52) U.S. Cl.
CPC ............... *B60C 7/08* (2013.01); *B60C 7/12* (2013.01); *B60C 11/0311* (2013.04); *Y10T 152/10288* (2015.01); *Y10T 152/10342* (2015.01)

(58) Field of Classification Search
CPC .. B60C 7/08; B60C 7/12; B60C 7/125; B60C 11/0311; B60B 15/02; B60B 15/023; B60B 15/025; B60B 15/026; Y10T 152/10342
USPC .. 152/246, 300, 306, 307, 308, 309, 209.12; 301/13, 43; D12/544
See application file for complete search history.

(56) References Cited

U.S. PATENT DOCUMENTS

| | | | | |
|---|---|---|---|---|
| 840,593 | A | * | 1/1907 | Stearns ......................... 152/323 |
| 856,526 | A | | 7/1907 | Hamilton |
| 969,887 | A | | 9/1910 | Lighthouse |
| 1,050,861 | A | | 1/1913 | Smith |
| 1,088,930 | A | * | 3/1914 | Restucci ....................... 152/307 |
| 1,356,414 | A | | 10/1920 | Still |
| 1,379,043 | A | | 5/1921 | Reed |
| 1,685,552 | A | * | 9/1928 | Michaud ..................... 152/334.1 |
| D106,079 | S | * | 9/1937 | Younglof ................. 152/209.13 |

(Continued)

*Primary Examiner* — Kip T Kotter
(74) *Attorney, Agent, or Firm* — Dickinson Wright PLLC

(57) ABSTRACT

A segmented tire apparatus includes generally arcuate tire segments each including a radial tread extending along an outer circumference of the respective tire segment. Each tire segment further includes a first group of semi-transverse treads extending from at least adjacent to the radial tread in a first direction and a second group of semi-transverse treads extending from at least adjacent to the radial tread in a second direction. Each one of the second group of semi-transverse treads is positioned in an offset but substantially aligned orientation relative to an associated one of the first group of semi-transverse treads. In an alternative embodiment, a segmented tire apparatus includes a plurality of tire segments mountable onto a rim, with a plate positioned between a first one of the plurality of tire segments and a second one of the plurality of tire segments.

10 Claims, 4 Drawing Sheets

(56) References Cited

U.S. PATENT DOCUMENTS

| | | | |
|---|---|---|---|
| 2,331,581 A | 10/1943 | Thompson | |
| 2,343,251 A | 3/1944 | Beard | |
| 3,567,287 A | 3/1971 | Nutter | |
| 5,046,785 A | 9/1991 | Bockerman | |
| 5,451,001 A | 9/1995 | Kumm | |
| 5,810,452 A | 9/1998 | Hawthorne et al. | |
| 7,231,948 B2 | 6/2007 | Forney, III et al. | |
| 8,281,832 B2 * | 10/2012 | Yagi et al. | 152/450 |
| 8,678,054 B2 * | 3/2014 | MacPherson | 152/306 |
| 2004/0129358 A1 * | 7/2004 | Ernst et al. | 152/209.5 |
| 2005/0205181 A1 * | 9/2005 | Forney et al. | 152/310 |
| 2009/0058176 A1 | 3/2009 | Beirne et al. | |
| 2009/0084478 A1 | 4/2009 | Wallet et al. | |
| 2010/0300589 A1 | 12/2010 | Henry | |
| 2013/0192734 A1 * | 8/2013 | Seljan | 152/306 |

* cited by examiner

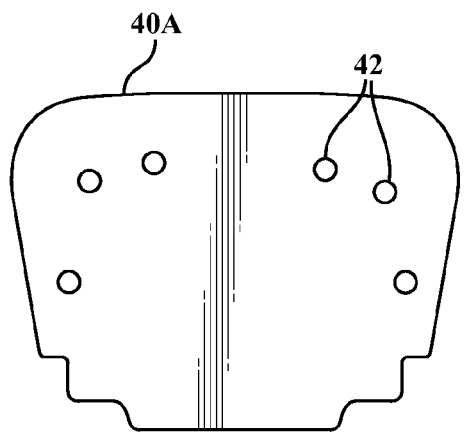
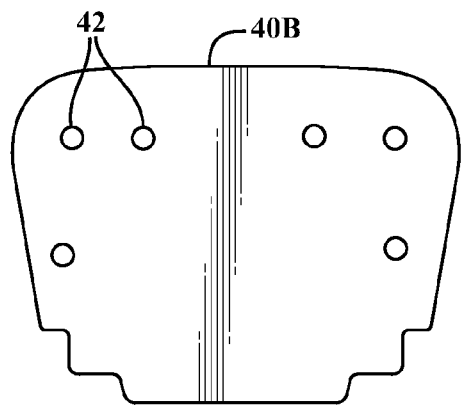
FIG. 5A  FIG. 5B
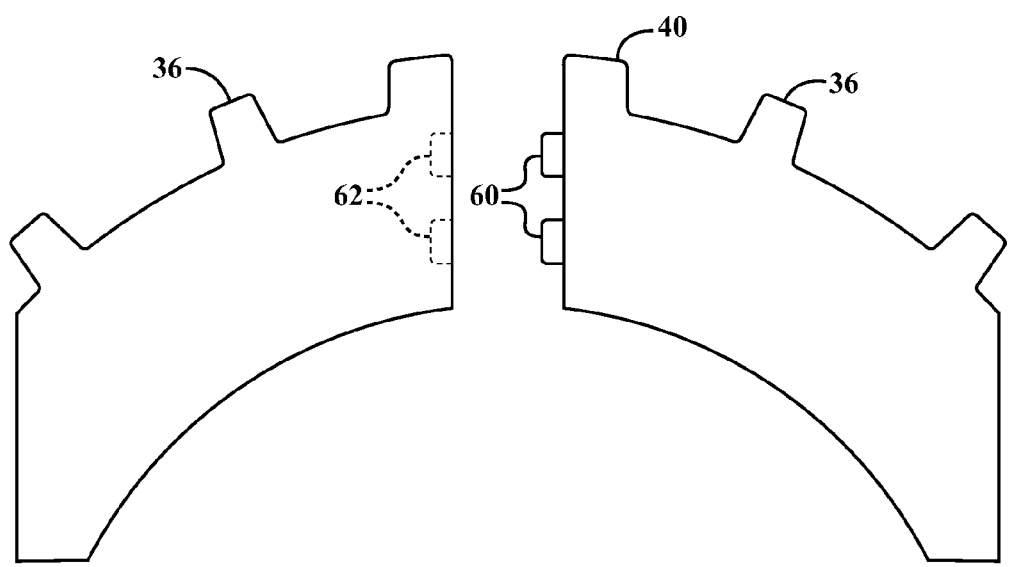
FIG. 6

SEGMENTED TIRE APPARATUS

CROSS REFERENCE TO RELATED APPLICATIONS

This application is a continuation of U.S. patent application Ser. No. 13/632,373 filed on Oct. 1, 2012, now U.S. Pat. No. 8,678,054, which was a continuation-in-part of U.S. patent application Ser. No. 13/038,082 filed on Mar. 1, 2011, the entire disclosures of each of which are incorporated herein by reference.

GOVERNMENT SUPPORT

Not Applicable

JOINT RESEARCH AGREEMENT

Not Applicable

BACKGROUND OF THE INVENTION

1. Field of the Invention

The present invention relates to irrigation system towers and tires and more particularly pertains to a new Segmented Tire Apparatus for improving the reliability and performance of irrigation systems.

2. Description of the Prior Art

The use of irrigation system towers and tires is known in the prior art. More specifically, irrigation system towers and tires heretofore devised and utilized are known to consist basically of familiar, expected and obvious structural configurations, notwithstanding the myriad of designs encompassed by the crowded prior art which have been developed for the fulfillment of countless objectives and requirements.

Illustrative examples of such prior art include: U.S. Pat. No. 5,046,785 issued on Sep. 10, 1991 to Bockerman; U.S. Pat. No. 5,451,001 issued on Sep. 19, 1995 to Kumm, and U.S. Pat. No. 5,810,452 issued on Sep. 22, 1998 to Hawthorne et al.

In these respects, the Segmented Tire Apparatus according to the present invention substantially departs from the conventional concepts and designs of the prior art, and in so doing provides an apparatus primarily developed for the purpose of improving the reliability and performance of irrigation systems.

SUMMARY OF THE INVENTION

In view of the foregoing disadvantages inherent in the known types of irrigation system towers and tires now present in the prior art, the present invention provides a new Segmented Tire Apparatus construction wherein the same can be utilized for improving the reliability and performance of irrigation systems.

To attain this, the present invention generally comprises a plurality of arcuate tire segments coupleable end to end to form a circular tire. Each of the arcuate tire segments has a plurality of treads which may be radial, transverse, or semi-transverse.

Additionally the apparatus may be filled with a closed cell foam to provide stability and rigidity while inhibiting water from collecting on the inside of the tire.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is its ability to resist going flat while in service due to its integrated molded polymeric structure.

Another significant advantage of the present invention comes from the radial tread which provides traction and inhibits sliding when the wheel is positioned on a hill.

Still another significant advantage of the present invention is its capability to be foam filled to limit the amount of water, dirt, mud or other debris which can enter the tire if the outside wall should become cracked.

Even still another significant advantage comes from the more closely spaced semi-transverse lugs which provide more efficient energy transfer from the wheel to the ground and thereby making more efficient use of available horsepower to drive the wheels.

Yet another significant advantage of the present invention is its ability to implement renewable polymers into its manufacture, including but not limited to Polylactic Acid (PLA) also known as "Corn Plastic" and Polyethelene based upon sugarcane also known as "Green Polyethylene". Use of these renewable polymers may be implemented as a blend with traditional petrochemical based polymers.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 5A is a schematic front pattern diagram of illustrative first alignment patterns of the coupling flanges of the present invention.

FIG. 5B is a schematic front pattern diagram of illustrative second alignment patters of the coupling flanges of the present invention.

FIG. 6 is a schematic side pattern diagram of the alignment stub and cavity of the present invention.

DESCRIPTION OF PREFERRED EMBODIMENTS

Figure 1:
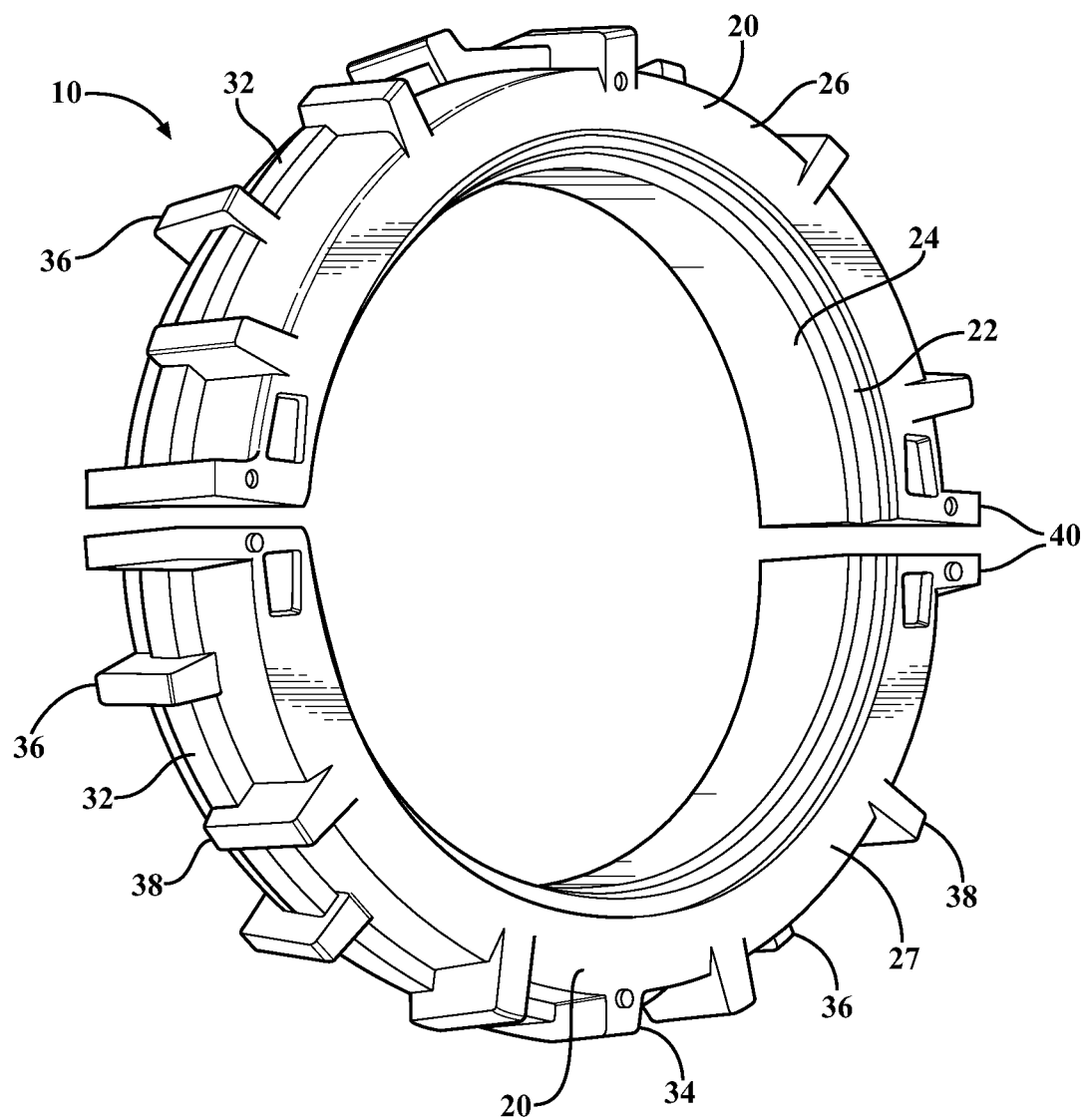
FIG. 1 is a schematic perspective view of an embodiment of the present invention.
Figure 2:
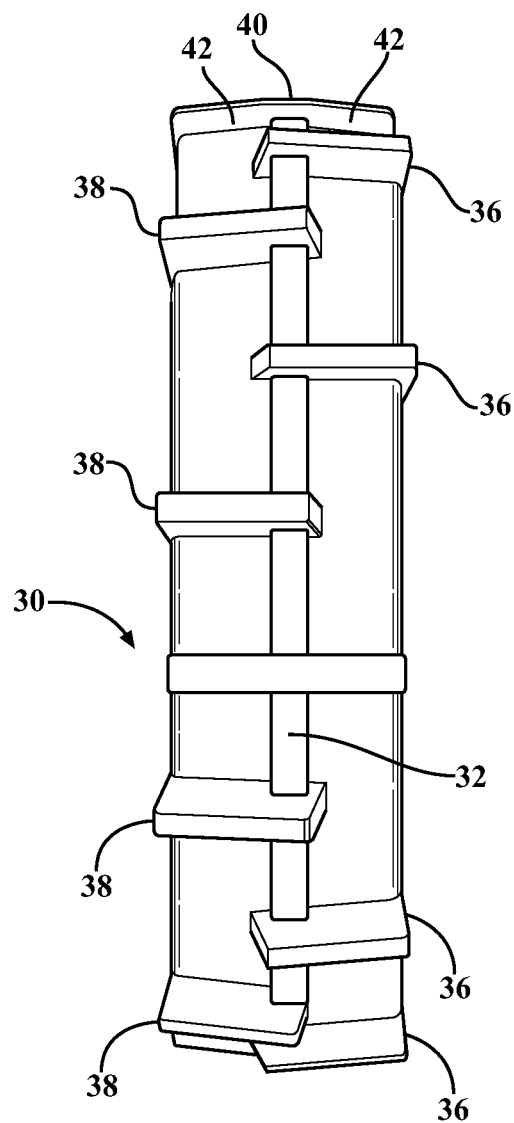
FIG. 2 is a schematic front view of the present invention.
Figure 3:
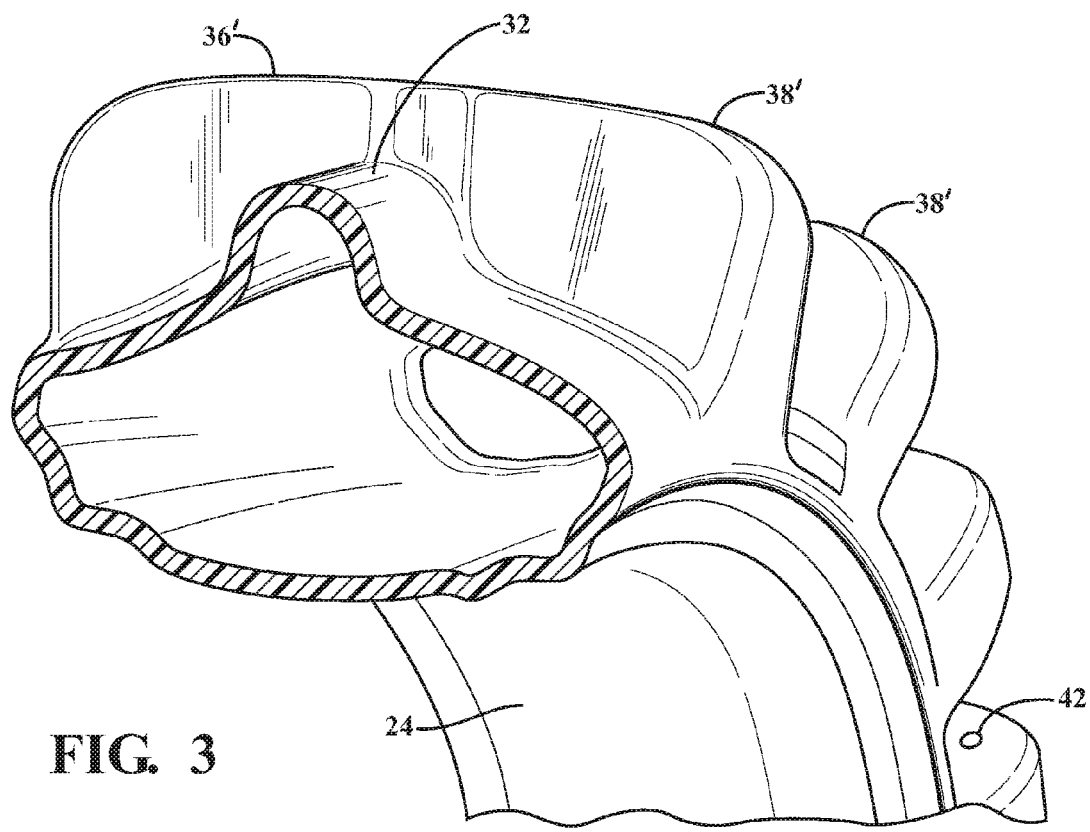
FIG. 3 is a schematic cross-sectioned view of an embodiment of a tire segment of the present invention.
Figure 4:
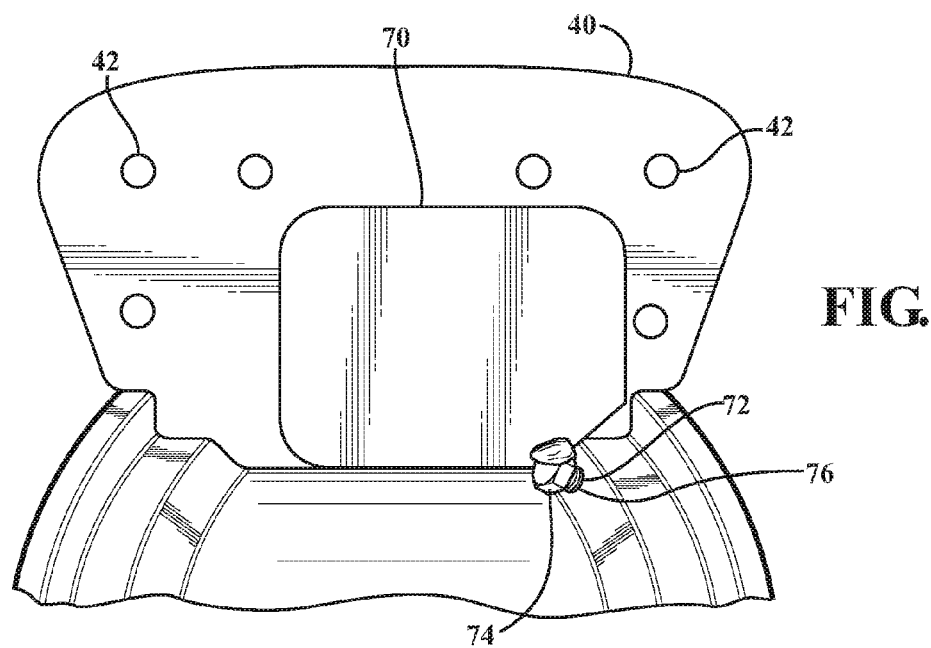
FIG. 4 is a schematic front view of a coupling flange and friction plate of the present invention.

With reference now to the drawings, and in particular to FIGS. 1 through 6 thereof, a new Segmented Tire Apparatus embodying the principles and concepts of the present invention and generally designated by the reference numeral 10 will be described.

As best illustrated in FIGS. 1 through 6, the Segmented Tire Apparatus 10 generally comprises a pair of substantially semi-circular tire segments 20 which can be coupled together and mounted to a rim.

In a preferred embodiment, each one of the semi-circular tire segments 20 further may also include an integral body which forms beads 22, an inner wall portion 24, sidewalls 26, 27, and treads 30. The beads 22 abut grooved portions of the rim to facilitate positioning and securing of the pair of tire segments 20 to the rim. The treads 30 provide traction for the segmented tire apparatus 10 on the ground. The side walls 26, 27 operationally couple the beads 22 and the treads 30.

In a further preferred embodiment, each one of the pair of semi-circular tire segments 20 may include a pair of coupling flanges 40. Each one of the pair of coupling flanges 40 is positioned on an associated end of the semi-circular tire segment 20. The coupling flanges 40 each may include a plurality of apertures 42 which extend through the coupling flange 40. Each one of the plurality of apertures 42 is aligned with an associated aperture 42 of a coupling flange 40 of the other semi-circular tire segment 20 when the semi-circular tire segments 20 are mounted on the rim. Additionally, the coupling flanges 40 are selectively secured together using a plurality of fastening means (not shown).

In at least one additional embodiment, each one of the plurality of fastening means further may also include a bolt, a washer, a lock washer and a nut. The bolt may be inserted through an associated pairing of the apertures 42 through coupling flanges 40 of the first and second semi-circular tire segments 20. The washer is positionable over a threaded portion of the bolt when the bolt is installed and the washer preferably abuts a surface of the coupling flange 40. Similarly, the lock washer is positioned over the threaded portion of the bolt after the washer and abuts a surface of the washer. The nut threadably engages the bolt after the lock washer and selectively securing the bolt. The first and second semi-circular tire segments 20 apply a compressive force onto the rim when the coupling flanges 40 are tightly coupled.

Preferably, each one of the pair of semi-circular tire segments 20 is made of a polymeric material. By way of example and not for purposes of limitation, one acceptable and preferred polymeric material is polyethylene.

In at least one embodiment, each one of the semi-circular tire segments 20 is made of a polymeric material incorporating at least a portion of renewable polymers into its manufacture, such as Polylactic Acid (PLA) or "Green Polyethylene".

In a further preferred embodiment, the apparatus also includes at least one friction plate 70, which is positioned between two tire segments 20 such that a first surface of the friction plate 70 abuts a first coupling flange 40 of a first one of the tire segments 20 and a second surface of the friction plate 70 abuts a second coupling flange 40 of a second one of the tire segments 20. The friction plate 70 may be coupled to the rim. This helps to provide more rigid coupling of the tire 10 to the rim than the friction fit available from utilizing the coupling flanges 40 alone.

The friction plate 70 may be coupled to the rim by a variety of methods including aperture/bolt pairs, rivets, welding, or other similar methods. More preferably, the friction plate 70 includes a threaded stud portion 72 which may be positioned through a valve stem hole 76 in the rim. The threaded stud portion 72 may be welded onto the body of the friction plate 70, a threaded insert into the body of the friction plate 70 or integrally formed into the friction plate 70. The threaded stud portion 72 may be secured to the rim with a nut 74.

In even still a further embodiment, each one of the pair of semi-circular tire segments 20 may include a radial tread 32, which extends along an outer circumference. The radial tread 32 is positioned substantially along a cross-sectional centerline of the tread portion 30 of the semi-circular tire segment 20. The radial tread 32 is particularly important when the wheel is deployed on uneven surfaces, such as a hillside, where there is a natural propensity to slide perpendicular to the direction of tire rotation.

In a preferred embodiment, each one of the pair of semi-circular tire segments 20 also includes a transverse tread 34 positioned at substantially a 90 degree position of the arc formed by the semi-circular tire segment 20. The transverse tread 34 is substantially perpendicular to the radial tread 32.

In a further embodiment, each one of the pair coupling flanges 40 for each one of the pair of semi-circular tire segments 20 also form a transverse tread positioned substantially at either a 0 or 180 degree position of the arc formed by the semi-circular tire segment 20. When the pair of semi-circular tire segments 20 is mounted to the rim by the coupling flanges 40, the transverse treads formed by the coupling flanges are approximately twice as wide as the semi-transverse treads 36, 38 positioned between 0 and 180 degrees.

In even still a further embodiment, each tire segment includes a first set of semi-transverse treads 36' and a second set of semi-transverse treads 3' forming semi-transverse tread pairs 36', 38' with the leading; edge of each one of the second set of semi-transverse treads 38' being substantially aligned with a trailing edge of one of the first set of semi-transverse treads 36'. Preferably, the semi-transverse tread pairs 36', 38' are in a spaced array with semi-transverse tread pairs 36', 38' being spaced every 18 degrees plus or minus 8 degrees around the circumference of the apparatus. More preferably, the semi-transverse tread pairs 36', 38' are spaced every 18 degrees plus or minus 3 degrees.

In yet a further embodiment, each one of the semi-circular tire segments 20 has a substantially hollow integral body. The hollow integral body may be filled with a polymeric material during manufacturing, may be filed with a polymeric material in the field or may be left hollow. The polymeric material adds rigidity and stability to the tire segments 20. Additionally, in the event that a tire segment 20 is cracked or otherwise damages causing a breach into the interior space, the polymeric material limits the amount of water, mud, dirt, and debris which can enter the interior space. It will be readily appreciated by those skilled in the art, that a cracked tire, which is allowed to fill with water, and then freeze, will be subject to extensive damage from the expanding water as it freezes. Often this necessitates replacing the tire. The use of the polymeric material helps to eliminate this further extensive damage, even if a tire or tire segment is cracked. Examples of suitable polymeric materials include, but are not limited to closed cell spray urethane and polystyrene.

Additionally, in the most preferred embodiment the integral body is substantially UV resistant.

In a further preferred embodiment, the present invention includes two semi-circular tire segments. As best shown in FIGS. 5A and 5B, the first semi-circular tire segment includes a first coupling flange 40A and a second coupling flange 40B. Similarly, the second semi-circular tire segment includes a third coupling flange 40B and a fourth coupling flange 40A. Each of the coupling flanges 40A, 40B have a plurality of apertures 42 to facilitate securing each of the semicircular tire segments to each other and thereby creating a compressive force onto the rim. The plurality of apertures 42 on the first coupling flange 40A and the plurality of apertures 42 on the fourth coupling flange 40A are deployed in a first alignment pattern such that the apertures 42 for the first coupling flange 40A substantially align with the apertures 42 for the fourth coupling flange 40A. Similarly, the plurality of apertures 42 on the second coupling flange 40B and the plurality of apertures 42 on the third coupling flange 40B are deployed in a second alignment pattern such that the apertures 42 for the second coupling flange 40B substantially align with the apertures 42 for the third coupling flange 40B. The first alignment pattern is different that the second alignment pattern. Thus the tire segments may be coupled together in only one orientation. This assures that the treads are all oriented in the same way.

In another embodiment, the present invention includes two semi-circular tire segments. The first semi-circular tire segment includes a first coupling flange and a second coupling flange. Similarly, the second semi-circular tire segment includes a third coupling flange and a fourth coupling flange. The first coupling flange includes a plurality of alignment studs 60 extending outwardly from a mating surface of the first coupling flange. The second coupling flange includes a plurality of alignment cavities 62 extending inwardly from a mating surface of the second coupling flange. Similarly the third coupling flange includes a plurality of alignment studs 60 extending outwardly from a mating surface of the third coupling flange; and the fourth coupling flange includes a plurality of alignment cavities 62 extending inwardly from a mating surface of the second coupling flange. When properly positioned, the alignment studs 60 of the first coupling flange are substantially aligned with the alignment cavities 62 of the fourth coupling flange and the alignment studs 60 of the third coupling flange are substantially aligned with the alignment cavities 62 of the second coupling flange. Thus the tire segments may be coupled together in only one orientation. This assures that the treads are all oriented in the same way.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed:

1. A segmented tire apparatus comprising:
   a plurality of tire segments mountable onto a rim and each being generally arcuate between a first end and a second end of a respective tire segment;
   each of said plurality of tire segments including a first coupling flange positioned at said first end of said respective tire segment;
   each of said plurality of tire segments including a second coupling flange positioned at said second end of said respective tire segment; and
   a plate positioned radially inward of said first coupling flange of a first one of said plurality of tire segments and radially inward of said second coupling flange of a second one of said plurality of tire segments.

2. The segmented tire apparatus of claim 1, wherein said plate includes a fastening member being alignable with a valve stem hole in the rim and said fastening member being securable to the rim to fasten said plate to the rim for transferring torque from the rim to the segmented tire apparatus.

3. The segmented tire apparatus of claim 2, wherein said fastening member includes a threaded stud positionable through the valve stem hole and securable with a nut.

4. The segmented tire apparatus of claim 1, further comprising:
   said plurality of tire segments including a first tire segment and a second tire segment;
   each one of said coupling flanges having a plurality of apertures extending therethrough for receiving a fastening means to pair said first tire segment and said second tire segment;
   said first and second tire segments applying a compressive force on the rim when said first and second tire segments are mounted to the rim and said coupling members of said first tire segment are tightly coupled to said coupling members of said second tire segment.

5. The segmented tire apparatus of claim 1, further comprising:
   wherein said plurality of tire segments having a hollow integral body; and
   wherein said integral body is UV resistant.

6. The segmented tire apparatus of claim 1, further comprising:
   wherein each of said plurality of tire segments includes at least one transverse tread extending perpendicularly to a centerline which extends arcuately between said first and second ends of said respective tire segment.

7. The segmented tire apparatus of claim 1, further comprising:
   wherein said plurality of tire segments includes a first tire segment and a second tire segment;
   said first tire segment having said first coupling flange positioned at a first end of said first tire segment and said second coupling flange positioned at a second end of said first tire segment;
   said second tire segment having said first coupling flange positioned at a first end of said second tire segment and said second flange positioned at a second end of said second tire segment;

said first coupling flanges of said first and second tire segments each having a plurality of apertures extending therethrough in a first alignment pattern;

said second coupling flanges of said first and second tire segments each having a plurality of apertures extending therethrough in a second alignment pattern; and said first alignment pattern being different from said second alignment pattern whereby said first coupling flanges may not be coupled to said second coupling flanges.

8. The segmented tire apparatus of claim 1, further comprising:

wherein said plurality of tire segments comprises a first tire segment and a second tire segment;

said first tire segment having said first coupling flange positioned at a first end of said first tire segment and a second coupling flange positioned at a second end of said first tire segment;

said second tire segment having said first coupling flange positioned at a first end of said second tire segment and said second coupling flange positioned at a second end of said second tire segment;

said first ends of said first and second tire segments each having at least one alignment stud extending outwardly therefrom;

said second ends of said first and second tire segments each having at least one alignment cavity extending inwardly therefrom;

said at least one alignment stud and said at least one alignment cavity being substantially aligned and mating when said first tire segment and said second tire segment are properly positioned.

9. The segmented tire apparatus of claim 1, wherein each one of said plurality of tire segments is UV resistant.

10. The segmented tire apparatus of claim 1, wherein each one of said plurality of tire segments partially comprises polylactic acid (PLA).

* * * * *

UNITED STATES PATENT AND TRADEMARK OFFICE
CERTIFICATE OF CORRECTION

PATENT NO. : 9,586,443 B2  Page 1 of 1
APPLICATION NO. : 14/155423
DATED : March 7, 2017
INVENTOR(S) : Eric R. MacPherson It is certified that error appears in the above-identified patent and that said Letters Patent is hereby corrected as shown below:

Column 4, Line 48, "3'" should read -- 38' --

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*